Figure 1:
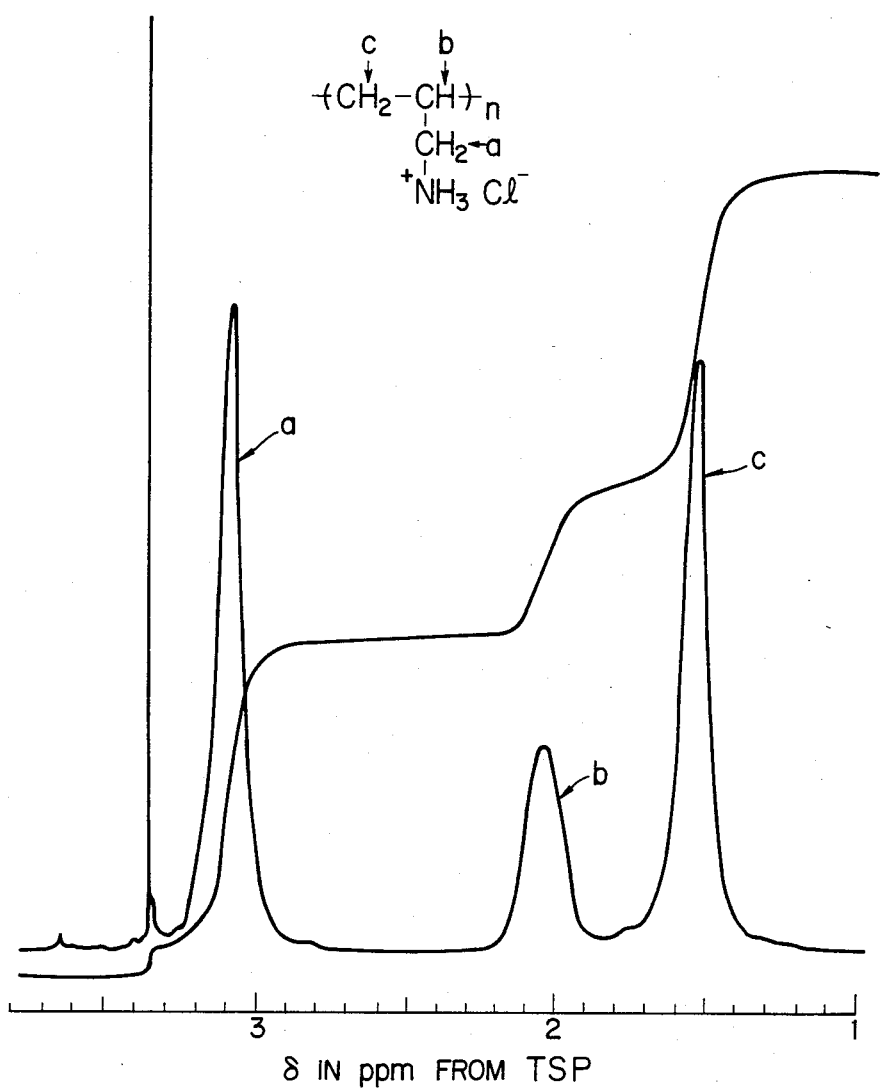

United States Patent [19]

Harada et al.

[11] Patent Number: 4,540,760

[45] Date of Patent: Sep. 10, 1985

[54] PROCESS FOR PRODUCING POLYMERS OF MONOALLYLAMINE

[75] Inventors: Susumu Harada; Kiyoshi Shimizu; Hajime Serizawa, all of Koriyama, Japan

[73] Assignee: Nitto Boseki Co. Ltd., Fukushima, Japan

[21] Appl. No.: 669,319

[22] Filed: Nov. 7, 1984

[30] Foreign Application Priority Data

Jan. 11, 1984 [JP] Japan .................................. 59-3150
Sep. 1, 1984 [JP] Japan ............................... 59-183601

[51] Int. Cl.$^3$ .......................... C08F 4/04; C08F 26/02
[52] U.S. Cl. ..................................... 526/211; 526/212; 526/218.1; 526/219; 526/219.1; 526/219.2; 526/219.3; 526/219.5; 526/276; 526/281; 526/291; 526/310; 526/215
[58] Field of Search ............... 526/218, 193, 204, 212, 526/216, 276, 281, 291, 310, 218.1, 219, 219.1, 219.2, 219.3, 219.5

[56] References Cited

U.S. PATENT DOCUMENTS

| | | | |
|---|---|---|---|
| 2,456,428 | 12/1948 | Parker | 260/80 |
| 2,471,959 | 5/1949 | Hunt | 526/218.1 |
| 3,062,798 | 11/1962 | Lovett | 260/89.7 |
| 3,992,369 | 11/1976 | Moore, Jr. | 526/217 |
| 4,053,512 | 10/1977 | Panzer et al. | 525/307 |
| 4,329,441 | 5/1982 | Bergthaller | 526/245 |
| 4,504,640 | 3/1985 | Harada et al. | 526/291 |

FOREIGN PATENT DOCUMENTS 0095233 11/1983 European Pat. Off. .
2946550 5/1981 Fed. Rep. of Germany .
296423 6/1975 U.S.S.R. .

OTHER PUBLICATIONS

V. A. Kabanov et al., Vysokomol Soed., 18 No. 9, 1957-1962, (1976), and 18 No. 10, 2233-2238, (1976).
Yoshikazu Hatsuhama et al., Kogyo Kagaku Zasshi 64 No. 3, 595, (1961).
Allyl Compounds and Their Polymers, Wiley-Interscience, 1973, pp. 29-30 & pp. 523-524.
R. C. Laible, Chem. Rev. 58, (5), 807-843, (1958).
V. V. Zykova et al., Tr. Inst. Khim. Nauk., Akad. Nauk. Kaz SSR 11 89-94, (1964).

Primary Examiner—Joseph L. Schofer
Assistant Examiner—N. Sarofim
Attorney, Agent, or Firm—Bert J. Lewen; Henry Sternberg

[57] ABSTRACT

In a process for producing a polymer of monoallylamine comprising polymerizing monoallylamine, the polymerization is carried out using as a monomer inorganic acid salts (e.g., hydrochloride, sulfate, etc.) of monoallylamine in the presence of an azo type radical initiator.

By the process, polymers of monoallylamine having a high degree of polymerization can be obtained in high yield.

16 Claims, 1 Drawing Figure

PROCESS FOR PRODUCING POLYMERS OF MONOALLYLAMINE

The present invention relates to a process for producing polymers of monoallylamine ($CH_2=CHCH_2NH_2$).

As is well known in the art, allyl compounds are polymerized with usual radical initiators only with difficulty and at best, polymers of a low polymerization degree are formed generally in a low yield.

It may be explained because self-termination would occur due to the reaction of hydrogen atoms present in the allyl group and the radical. This reaction is generally called "allylic degradative chain transfer".

This fact is common knowledge to chemists in the field of high molecular chemistry, as is acknowledged in many papers and test books (for example, C. E. Schildknecht, "Allyl Compounds and their Polymers"; Wiley-Interscience: 1973, pages 29–30 and R. C. Laible, Chem. Rev., 58(5), 807–843 (1958)).

This phenomenon also occurs unexceptionally on monoallylamine which is a sort of allyl compounds. Monoallylamine is scarecely polymerized with usual radical type initiators or ion type initiators; only a few reports are published on polymerization of monoallylamine under special conditions as described below.

1. A process for producing a brown, resinous polymonoallylamine (hereafter simply referred to as "polyallylamine") comprising gas phase polymerization using tetrafluorohydrazine as a catalyst (U.S. Pat. No. 3,062,798);

2. A process for producing a resinous (black-brown) polyallylamine hydrochloride having a molecular weight of 950 to 1000 which comprises adding a small quantity of water to monoallylamine hydrochloride and, heating the mixture at 80° to 85° C. to bring the system in a melt state followed by polymerization while adding hydrogen peroxide thereto in small quantities (V. V. Zykova, et al., Tr. Inst. Khim Nauk, Akad. Nauk Kaz. SSR, 11, 89–94 (1964), Chem. Abst., 61, 14855 (1964));

3. A process which comprises dissolving monoallylamine hydrochloride in a tert-butyl alcohol-chlorobenzene solvent mixture in the presence of diethyl phosphite and then polymerizing at a reflux temperature of the solvent using azobisisobutyronitrile as an initiator (German Offenlegungsschrift No. 2,946,555 and the corresponding Japanese Application KOKAI (the term "KOKAI" refers to an application which has yet been unexamined but published and is thus open to public inspection) No. 82807/81).

Processes 1, 2 and 3 described above are concerned with polymerization of monoallylamine using catalysts such as radical initiators, etc. In Processes 1 and 2, the obtained polymers are all viscous and resinous, but no polymer having a high polymerization degree is obtained.

Process 3 described in the German Offenlegungsschrift is concerned with homopolymerization and copolymerization of monoallylamine hydrochloride. However, the examples described therein are all directed to copolymerization of monoallylamine with easily polymerizable vinyl monomers (acrylamide, acrylic acid, acrylic acid esters, acrylonitrile, etc.), except for one example. In the only one example involving homopolymerization described at page 36 of the German Offenlegungsschrift, polyallylamine hydrochloride is obtained in a yield of 85%. However, the so obtained polymer is not described either by its form or by polymerization degree; it is merely stated that the polymer is water soluble over the whole pH range. The present inventors have repeated the example and as the result, they have noted that a hygroscopic product having a lower molecular weight was obtained merely in a yield of about 0.6% (refer to Comparison Example 1 later described). In this connection, no example for any homopolymerization of allyl ammonium salt is included in the corresponding Japanese Patent Application (Japanese Patent Application KOKAI No. 82807/81).

As other processes for polymerizing monoallylamine, the following processes for polymerization using radiations have also been proposed. According to these processes, polymers of monoallylamine having a high polymerization degree are obtained as compared to that using radical catalysts. Namely:

4. A process which comprises polymerizing monoallylamine by gamma rays irradiation or by UV irradiation in the presence of hydrogen peroxide in a protonic acid (phosphoric acid, sulfuric acid, hydrochloric acid) (V. A. Kabanov, et al., Vysokomol. Soed., 18, No. 9, 1957–1962 (1976) and 18, No. 10, 2233–2238 (1976));

5. A process which comprises polymerizing monoallylamine, allylcyanide or allyl mercaptan with a variety of irradiation of various radiations (gamma rays, electron rays, x rays, UV rays) in the presence of an inorganic acid or an inorganic acid salt of a metal belonging to Group I or II of the Periodic Table (L. S. Polak, V. A. Kabanov et al., U.S.S.R. Pat. No. 296,423);

In the U.S.S.R. Patent supra, polymerization using a radical catalyst is included; however, the examples merely mention polymerization of allyl cyanide using benzoyl peroxide in the presence of zinc chloride and polymerization of allyl mercaptan using hydrogen peroxide in the presence of calcium chloride. Nothing is disclosed on polymerization of monoallylamine using a radical catalyst therein.

The foregoing processes directed to polymerization of monoallylamine all fail to obtain polyallylamine in a high yield in a simple manner.

On the other hand, polyallylamine is an extremely interesting polymer for practical purpose and, attempts to produce polyallylamine or N-alkyl-substituted derivatives thereof have also been made by chemically modifying other vinyl polymers. Examples of such attempts are shown below:

6. A process for producing polyallylamine which comprises hydrogenation of polyacrylonitrile latex U.S. Pat. No. 2,456,428);

7. A process for synthesis of polyallylamine which comprises reducing polyacrolein oxime (Yoshikazu Hatsuhama, et al., Kogyo Kagaku Zasshi, 64, No. 3, 595 (1961));

8. A process for obtaining a polymer of trimethylallyl ammonium chloride which comprises reacting a polymer (molecular weight, about 900) of allyl chloride with trimethylamine (U.S. Pat. No. 4,053,512);

9. A process for producing poly-(N,N-dimethylallylamine) which comprises reducing a polymer of N,N-dimethylacrylamide (U.S. Patent supra).

Of the 9 processes for producing polymers of monoallylamine or N-substituted derivatives thereof described above, relatively preferred are radiation polymerization using gamma rays in protonic acids as described in Processes 4 and 5. As is well known in the art, however, radiation polymerization is not an excellent method for producing large quantities of polymers. As a matter of fact, no polymer is produced in an industrial scale according to these processes involving radiation polymerization. Thus, polyallylamines have not been produced yet in an industrial scale.

Only recently, one (Harada) of the present inventors has found that when inorganic acid salts of monoallylamine are polymerized in a polar solvent using an azo type radical initiator containing a group having a cationic nitrogen atom in the molecule thereof, polymers can easily be obtained and based on the finding, a patent application was filed (Japanese Patent Application No. 54988/83, now open to public inspection as Japanese Patent Application KOKAI No. 20181/83). In Japanese Patent Application KOKAI No. 20181/83, it is disclosed that it is important that both monomer and initiator have electric charges in polymerization system, as a requirement for smooth proceeding in polymerization of inorganic acid salts of monoallylamine. In this case, in terms of the initiator, the disclosure obviously refers to the nitrogen atom having a cationic charge.

The present inventors have investigated to develop more effective polymerization initiators and polymerization system, upon polymerization of inorganic acid salts of monoallylamine in a polar solvent, which can provide polymers of a high polymerization degree in a high yield. As a result, the present inventors have discovered that inorganic acid salts of monoallylamine can easily be polymerized using an azo type initiator selected from azo compounds represented by formulae (III), (IV), (VII) and (VIII):

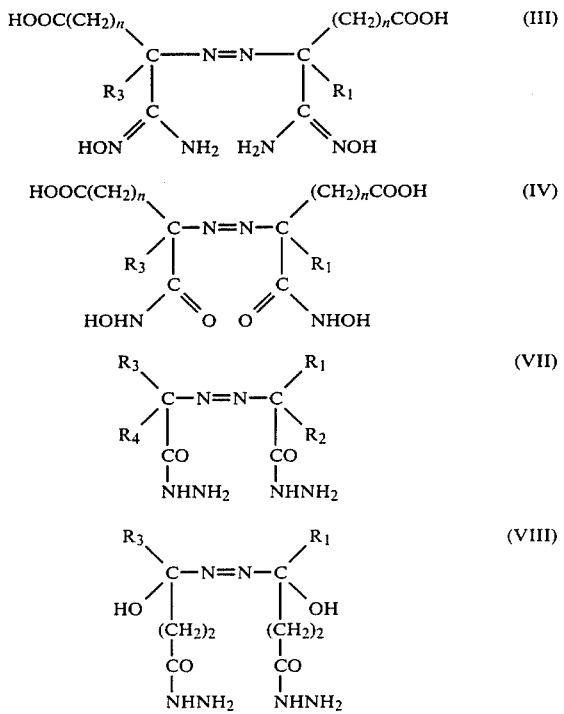

wherein $R_1$, $R_2$, $R_3$ and $R_4$ each represents, which may be the same or different, a hydrocarbon group; $R_1$ and $R_2$ or/and $R_3$ and $R_4$ may be combined to complete a ring together with the carbon atom attached thereto; and n represents 0 or an integer of 1 to 4.

That is, the present invention relates to a process for producing polymers of monoallylamine which comprises polymerizing inorganic acid salts of monoallylamine in a polar solvent in the presence of the azo type radical initiator selected from the azo compounds represented by the general formulae (III), (IV), (VII) and (VIII) described above, wherein $R_1$ through $R_4$, n have the same significances as defined above; hereafter the same.

In the formulae above, $R_1$ through $R_4$ each represent, which may be the same or different, a hydrocarbon group, preferably a straight or branched alkyl group having 1 to 4 carbon atoms or, a cycloalkyl group having 3 to 6 carbon atoms (cyclopentane ring, cyclohexane ring, etc.), a phenyl group or a benzyl group or, $R_1$ and $R_2$ or/and $R_3$ and $R_4$ are combined to complete a ring together with the carbon atom attached thereto.

The azo type radical initiators represented by formulae (III), (IV), (VII) and (VIII) are disimilar to the azo type radical initiator used in the process of Japanese Patent Application KOKAI No. 201811/83 supra in the following point. Namely, the azo type initiator of the Japanese Patent Application KOKAI No. 201811/83 contains a nitrogen group which constitutes a strongly basic moiety such as an amidino group or an alkylamino group. In contrast, the nitrogen atom contained in the amidoxime group (formula (III)), the hydroxamic acid moiety (formula (IV)), or the hydrazide moiety (formulae (VII) and (VIII)) is markedly weak in its basicity, as compared to the nitrogen atom of the amidino group or the alkylamino group contained in the initiator of the Japanese Patent Application KOKAI No. 201811/83. In addition, the azo type radical initiators represented by formulae (III) and (IV) further contain a —COOH group showing a property as an acid. Of course, polymerization is carried out mainly in a polar solvent in the presence of a strong acid and, it would thus be difficult for the —COOH group contained in the azo type radical initiator. represented by formula (III) or (IV) to be present in the form of an anion as in —COOH⁻+H⁺; in spite, the possibility of ionic dissociation of this type is not completely denied.

Taking the foregoing facts or properties into account in combination with the technical background, it is quite surprizing that marked effects are attained by the use of the azo type radical initiators represented by formulae (III), (IV), (VI) and (VIII), notwithstanding that it was expected that no effect would be obtained even if these azo compounds were used as initiators for polymerization of inorganic acid salts of monoallylamine.

Furthermore, as is mentioned in Japanese Patent Application KOKAI No. 201811/83 supra filed by the present applicant, it has been clarified that radical initiators effective for inorganic acid salts of monoallylamine are greatly governed by the structure of a substituent(s) adjacent to the azo group. On the other hand, it is well known that an amidino group is generally readily hydrolized to form an amide and an amine. This is not unexceptional with the initiator (given by formula (A) below) having an amidino group in Japanese Patent Application KOKAI No. 201811/83; where, the amidino group is readily hydrolized to form an amide (given by formula (B) below):

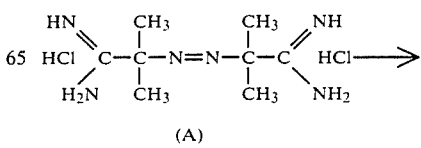

(A)

-continued

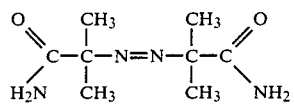

(B)

The thus formed initiator (B) is ineffective for polymerization of inorganic acids of allylamine.

Turning to the azo type initiators represented by formulae (VII) and (VIII), the hydrazide moiety contained therein is markedly resistant to hydrolysis as compared to the amidino group contained in the initiator of the prior Japanese Patent Application. The hydrazide moiety is only slowly decomposed to form an acid so that an efficiency loss as the initiator is minimized. Accordingly, the azo type initiators of formulae (VII) and (VIII) encounter an additional advantage in that the addition amount can be reduced to, for example, about ⅓ that of the initiator of the Japanese Patent Application. This is greatly advantageous in the case of producing polyallylamine in an industrial scale.

The azo type initiator represented by formula (VII) may also be used in combination with the azo type initiator represented by formula (VIII), to effect polymerization.

Other conditions for polymerization are explained below.

Preferred examples of inorganic acid salts of monoallylamine which can be employed in the present invention include hydrochloride, sulfate, sulfite, phosphate, etc. Of these salts, the hydrochloride is particularly preferred.

Polymerization is carried out in a polar solvent, namely, in water, inorganic acids (hydrochloric acid, sulfuric acid, phosphoric acid, polyphosphoric acid, etc.) or an aqueous solution thereof, organic acids (formic acid, acetic acid, propionic acid, lactic acid, etc.) or an aqueous solution thereof, or an alcohol, dimethyl sulfoxide, dimethylformamide, formamide, an aqueous solution of inorganic acid salts (zinc chloride, calcium chloride, magnesium chloride, etc.).

Upon polymerization, the aforesaid inorganic acid salts (e.g., hydrochloride) of monoallylamine may be generally used in the form of isolated crystals. Alternatively, a predetermined amount of monoallylamine is added to an aqueous inorganic acid (e.g., hydrochloric acid) solution and then, if necessary the aforesaid inorganic acid salts (e.g., zinc chloride) is directly added to the mixture and, the resulting solution may be provided for polymerizations as it is. In case that inorganic acids or an aqueous solution thereof are used as media for polymerization, needless to say, a predetermined amount of monoallylamine is polymerized as it is by adding the same to inorganic acids or an aqueous solution thereof (e.g., hydrochloric acid).

It is generally preferred that the inorganic acid salts be added in a large amount; however, the solubility is different depending upon the solubility of a salt in water or in a solution containing various concentrations of monoallylamine hydrochloride and, it is thus difficult to uniformly define the addition amount in all cases. In any case, however, it is preferred that the inorganic acid salt be contained in an amount of 5 to 500 wt. % based on monoallylamine hydrochloride.

The thus obtained polymers of inorganic acid salts of monoallylamine may be converted, if necessary and desired, to polymers of monoallylamine or polymers of organic acid salts of monoallylamine, in a conventional manner.

Particularly preferred azo type initiators are given below:

In formula (III):

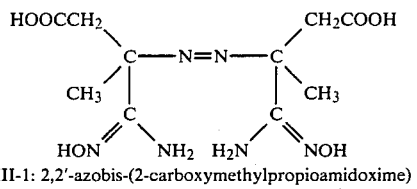
III-1: 2,2'-azobis-(2-carboxymethylpropioamidoxime)

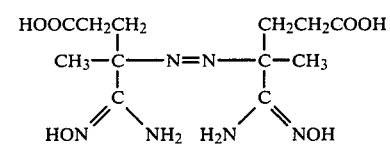
III-2: 2,2'-azobis-(2-carboxyethylpropioamidoxime)

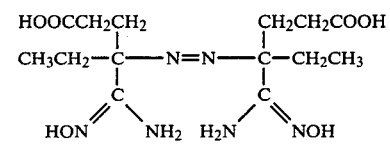
III-3: 3,3'-azobis-(3-carboxyethylbutyroamidoxime)

In formula (IV):

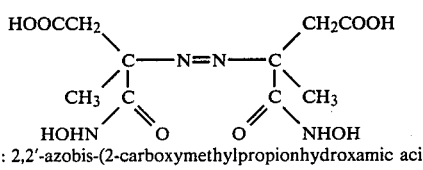
IV-1: 2,2'-azobis-(2-carboxymethylpropionhydroxamic acid)

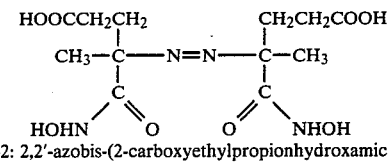
IV-2: 2,2'-azobis-(2-carboxyethylpropionhydroxamic acid)

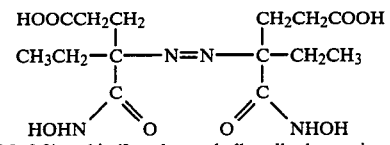
IV-3: 3,3'-azobis-(3-carboxyethylbutylhydroxamic acid)

In formula (VII):

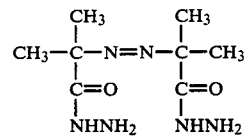
VII-1: 2,2'-azobis(2-methylpropionic hydrazide)

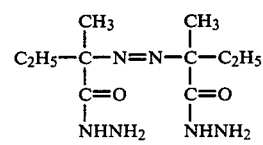
VII-2: 2,2'-azobis(2-methylbutyric hydrazide)

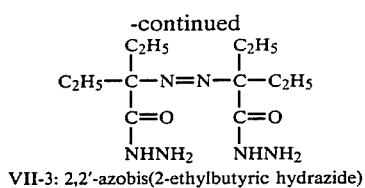

VII-3: 2,2'-azobis(2-ethylbutyric hydrazide)

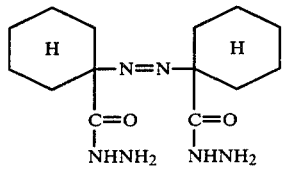

VII-4: 1,1'-azobis(1-cyclohexylcarboxylic hydrazide)

In formula (VIII):

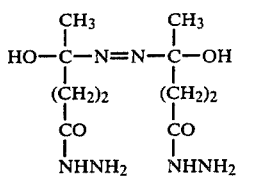

VIII-1: 4,4'-azobis(4-hydroxyvaleric hydrazide)

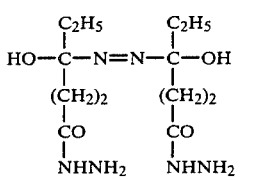

VIII-2: 4,4'-azobis(4-hydroxycaproic hydrazide)

The amount of the azo type initiator employed in the present invention is generally in a range of 0.1 to 10 wt. %, preferably in a range of 1 to 6 wt. %, based on the inorganic acid salt of monoallylamine.

Polymerization temperature varies depending upon chemical structure of the initiator but generally ranges from 30° to 100° C., preferably 40° to 70° C. A time required for polymerization is generally within 100 hours.

It is desired that the concentration of the starting monomer be as high as possible within its solubility; however, the concentration is generally in a range of 10 to 85 wt. %.

Polymerization is more or less inhibited by the oxygen in the air. It is thus desired that polymerization be carried out in an inert gas such as nitrogen, etc.

Hereafter the present invention will be described more in detail with reference to the examples and comparison example, wherein as monoallylamine (hereafter simply referred to as "MAA") used as the starting monomer, a fraction having a boiling point of 52.5° to 53° C. obtained by drying MAA made by Shell Chemical Co., U.S.A. over sodium hydroxide particles and rectifying it in a nitrogen flow was used. Examination by gas chromatography indicates that this fraction contained neither diallylamine nor triallylamine.

The present invention will be described in more detail with reference to the examples and comparison examples below.

FIG. 1 shows representative one $^1$H-NMR spectra of polymers of monoallylamine obtained using various azo type radical initiators in accordance with the process of the present invention.

EXAMPLE 1

This example shows a process for producing a polymer of monoallylamine comprising polymerization of monoallylamine in phosphoric acid using as an initiator 2,2'-azobis-(2-carboxyethyl-propioamidoxime) (hereafter referred to as Initiator III-2).

Synthesis of Initiator III-2

To a solution of 12 g (0.3 mol) of sodium hydroxide in 200 ml of water 24.6 g (0.15 mol) of hydroxyamine sulfate was added under ice-cooling while stirring. In the system 16.8 g (0.06 mol) of 4,4'-azobis(4-cyanovaleric acid) was added and the mixture was reacted at 35° to 40° C. for 20 hours. After completion of the reaction, the mixture was concentrated to dryness under reduced pressure. The residue was dissolved in 500 ml of acetone. From the resulting acetone solution, acetone was removed by distillation. The residue was washed with ethyl acetate and dried under reduced pressure. Yield 10.2 g (49%). From the result of elementary analysis, IR analysis, NMR analysis and the measurement of acidity, the product was identified to be Initiator III-2.

In a 2 liter-round bottomed flask equipped with a stirrer, a thermometer, a reflux condenser and a dropping funnel, 922.3 g (8 mols) of 85% phosphoric acid was charged and 224.8 g (4 mols) of MAA was dropwise added thereto while stirring. During the addition, the temperature was kept at 10° to 30° C. After completion of the dropwise addition, the system was warmed to 60° C. A solution of 11.0 g of Initiator III-2 in 40 g of 85% phosphoric acid was added to the thus obtained solution of MAA-phosphate in phosphoric acid. Then, polymerization was carried out at 60°±2° C. for 72 hours. After completion of the polymerization, a colorless, transparent viscous solution was obtained. The solution was poured into a large quantity of water to precipitate a polymer (polyallylamine-phosphate) in a rice cake form. After thoroughly washing the precipitates with water, the precipitates were dissolved in 550 ml of conc. hydrochloric acid to convert the polyallylamine-phosphate into the hydrochloride. The solution was added to a large quantity of methanol and the formed precipitates were taken out by filtration. The precipitates were extracted with methanol using a Soxhlet's extractor to remove the unpolymerized monomer and phosphoric acid. The precipitates were dried at 50° C. under reduced pressure to obtain 225 g (about 60%) of a polymer. By elementary analysis, IR spectrum analysis and $^1$H-NMR analysis, the polymer was identified to be PAA-HCl.

The $^1$H-NMR spectrum (in $D_2O$, 270 MHz, TSP internal standard) of this polymer is shown in FIG. 1.

The number average molecular weight $\overline{M}n$ of PAA-HCl determined by measurement of osmotic pressure in an aqueous saline solution was 22000.

The thus obtained PAA-HCl is freely soluble in water and an aqueous acid solution but insoluble in an organic solvent. The viscosity of an aqueous solution of PAA-HCl shows a typical behavior of a high molecular electrolyte.

When heated in the air, PAA-HCl decomposes at temperatures of 300° C. or higher without melting.

Next, free polyallylamine (PAA) was produced from PAA-HCl. That is, 30 g of PAA-HCl was dissolved in 270 g of distilled water and the solution was passed through a strongly basic ion exchange resin (Amberlite IRA-402) to remove hydrochloric acid. Freeze-drying of the filtrate gave 16.5 g of white PAA. PAA is readily soluble in water and in methanol and swells with dimethylsulfoxide and pyridine but is insoluble in ordinary organic solvents. When allowed to stand in the air, PAA absorbs carbon dioxide and moisture to form the carbonate.

EXAMPLE 2

This example shows a process for producing a polymer of monoallylamine comprising polymerization of monoallylamine hydrochloride in its aqueous solution using as an initiator 2,2'-azobis-(2-carboxyethyl-propionhydroxamic acid) (hereafter referred to as Initiator IV-2).

Synthesis of Initiator IV-2

To 5.19 g (0.015 mol) of 2,2'-azobis-(2-carboxyethylporpioamidoxime) (Initiator III-2, which synthesis is shown in Example 3), 15 g of cold, conc. hydrochloric acid was added. While stirring the mixture was reacted at 0° C. for 20 minutes. After completion of the reaction, the reaction mixture was poured into about 1 liter of acetone. The formed precipitates were taken out by filtration, washed with acetone and then dried under reduced pressure to obtain 2.77 g (53%) of white powders. From elementary analysis, IR spectrum analysis, $^1$H-NMR analysis and the measurement of acidity, the powders were identified to be Initiator IV-2.

Next, 570 g (10 mols) of MAA was dropwise added to 1.1 kg of conc. hydrochloric acid (35 wt. %) at 5° to 10° C. while stirring. After completion of the dropwise addition, water and excess hydrogen chloride were removed by distillation at 60° C. under reduced pressure of 20 mmHg using a rotary evaporator to obtain white crystals. The crystals were dried on silica gel for drying at 80° C. under reduced pressure of 5 mmHg to obtain 980 g of MAA-HCl. MAA-HCl contained about 5% of moisture.

In a 500 ml round bottomed flask equipped with a stirrer, a thermometer, a reflux condenser and a nitrogen gas inlet tube 98 g of the aforesaid MAA-HCl and 36 g of distilled water were charged. The mixture was stirred to dissolved the reactants, which was made a 70% aqueous solution of MAA-HCl. While introducing nitrogen gas therein, the system was warmed to 50° C. Then, a solution of 4.5 g of Initiator IV-2 in 10 ml of water was added directly to the system and the mixture was allowed to stand at 48° to 50° C. for 70 hours to effect polymerization. The thus obtained colorless, transparent viscous solution was added to a large quantity of methanol to precipitate a white polymer. The precipitates were taken out by filtration, washed with methanol and then dried at 50° C. under reduced pressure to obtain 73 g (about 74.5%) of PAA-HCl. The number average molecular weight $\overline{M}n$ of PAA-HCl determined by the measurement of osmotic pressure in an aqueous saline solution was 5500.

EXAMPLE 3

In a 200 ml Erlenmeyer's flask with a stopper, 100 g of a 70% aqueous solution of MAA-HCl prepared in Example 2 was charged. Initiator III-2 synthesized in Example 1 and Initiator IV-2 synthesized in Example 3 was added to the system. The mixture was allowed to stand at 60° C. for 50 hours to effect polymerization. After completion of the polymerization, the product was treated in a manner similar to Example 2. Thus PAA-HCl was obtained. The results are summarized in Table 1 below.

TABLE 1

| Kind of Initiator | Addition amount of Initiator g | Yield of polyallylamine hydrochloride g | % |
|---|---|---|---|
| Initiator III-2 | 1.036 | 36.5 | 52.3 |
| " | 1.554 | 39.5 | 56.4 |
| " | 2.073 | 40.6 | 58.0 |
| " | 2.591 | 42.5 | 60.7 |
| " | 3.108 | 50.1 | 71.6 |
| Initiator IV-2 | 1.042 | 39.6 | 56.6 |
| " | 1.563 | 35.3 | 50.4 |
| " | 2.084 | 50.9 | 72.7 |
| " | 2.605 | 53.0 | 75.7 |
| " | 3.126 | 54.3 | 77.6 |

EXAMPLE 4

This example shows a process for producing a polymer of a salt of monoallylamine and a polymer of monoallylamine comprising polymerization of monoallylamine in phosphoric acid using as an initiator 2,2'-azobis-(2-methylpropionic hydrazide) (hereafter referred to as Initiator VII-1).

Synthesis of Initiator VII-1

13.8 g of 2,2'-azobis-(methyl 2-methylpropionate) was dissolved in 60 ml of methanol and the solution was cooled with ice-water. A solution of 30 g of hydrated hydrazine in 100 ml of methanol was added thereto with stirring. The mixture was reacted for 48 hours. The formed precipitates were taken out by filtration, thoroughly washed with methanol and dried under reduced pressure. Yield 10.4 g (75.4%). From data on elementary analysis, IR spectrum, UV spectrum and NMR spectrum, the product was identified to be Initiator VII-1.

In a similar manner, Initiators VII-2 to VII-4, VIII-1 and VIII-2 were obtained from the corresponding esters or lactones.

In a 2 liter-round bottomed flask equipped with a stirrer, a thermometer, a reflux condenser and a dropping funnel, 922.3 g (8 mols) of 85% phosphoric acid was charged and 224.8 g (4 mols) of MAA was dropwise added thereto while stirring. During the addition, the temperature was kept at 10° to 30° C. After completion of the dropwise addition, the system was warmed to 60° C. To the thus obtained solution of MAA-phosphate in phosphoric acid, 9.2 g of Initiator VII-1 was added directly. Then, polymerization was carried out at 60°±2° C. for 72 hours. After completion of the polymerization, a colorless, transparent viscous solution was obtained. The solution was poured into a large quantity of water to precipitate a polymer (polyallylamine-phosphate) in a rice cake form. After thoroughly washing the precipitates with water, the precipitates were dissolved in 500 ml of conc. hydrochloric acid to convert the polyallylaminephosphate into the hydrochloride. The solution was added to a large quantity of methanol and the formed precipitates were taken out by filtration. The precipitates were extacted with methanol using a Soxhlet's extractor to remove the unpolymerized monomer and phosphoric acid. The precipitates were dried at 50° C. under reduced pressure to obtain 230 g (about 61%) of a polymer.

By elementary analysis, IR spectrum analysis and $^1$H-NMR analysis, the polymer was identified to be PAA-HCl.

The $^1$H-NMR spectrum (in $D_2O$, 270 MHz, TSP internal standard) of this polymer is essentially similar to that shown in FIG. 1.

The number mean molecular weight $\overline{M}n$ of PAA-HCl determined by measurement of osmotic pressure in an aqueous saline solution was 23000.

The thus obtained PAA-HCl is freely soluble in water and an aqueous acid solution but insoluble in an organic solvent. The viscosity of an aqueous solution of PAA-HCl shows a typical behavior of polyelectrolyte.

When heated in the air, PAA-HCl decomposes at temperatures of 300° C. or higher without melting.

Next, free polyallylamine (PAA) was prepared from PAA-HCl. That is, 30 g of PAA-HCl was dissolved in 270 g of distilled water and the solution was passed through a strongly basic ion exchange resin (Amberlite IRA-402) to remove hydrochloric acid. Freeze-drying of the filtrate gave 16.5 g of white PAA. PAA is readily soluble in water and in methanol and swells with dimethylsulfoxide and pyridine but is insoluble in ordinary organic solvents. When allowed to stand in the air, PAA absorbs carbon dioxide and moisture to form the carbonate.

EXAMPLE 5

570 g (10 mols) of MAA was dropwise added to 1.1 kg of conc. hydrochloric acid (35 wt. %) at 5° to 10° C. while stirring. After completion of the dropwise addition, water and excess hydrogen chloride were removed by distillation at 60° C. under reduced pressure of 20 mmHg using a rotary evaporator to obtain white crystals. The crystals were dried on silica gel for drying at 80° C. under reduced pressure of 5 mmHg to obtain 980 g of MAA-HCl. The MAA-HCl contained about 5% of moisture.

In a 300 ml round bottomed flask equipped with a stirrer, a thermometer, a reflux condenser and a nitrogen gas inlet tube, 100 g of the aforesaid MAA-HCl and 27 g of distilled water were charged. The mixture was stirred to dissolve the compounds, which was made a 75% aqueous solution of MAA-HCl. While introducing nitrogen gas therein, the system was warmed to 60° C. Then, 2.8 g of Initiator VII-1 was added directly to the system. The mixture was allowed to stand at 58° to 60° C. for 72 hours to effect polymerization. The thus obtained colorless, transparent viscous solution was added to a large quantity of methanol to precipitate a white polymer. The precipitates were taken out by filtration, washed with methanol and then dried at 50° C. under reduced pressure to obtain 53.5 g (about 56.3%) of PAA-HCl.

The number average molecular weight $\overline{M}n$ of PAA-HCl determined by the measurement of osmotic pressure in an aqueous saline solution was 8700.

EXAMPLE 6

To 300 g of MAA-HCl prepared in Example 5, 36 g of water was added. The mixture was warmed to 50° C. to dissolve the MAA-HCl. Thus a 85% aqueous solution of MAA-HCl was prepared.

Separately, 210 g of zinc chloride was weighed and water was added thereto to make the whole volume 300 g. Thus a 70% aqueous solution of zinc chloride was prepared.

In a 1 liter round bottomed flask equipped with a stirrer, a thermometer, a reflux condenser and a nitrogen gas inlet tube, 300 g of a 85% aqueous solution of the MAA-HCl and 300 g of a 70% aqueous solution of zinc chloride prepared above were charged. While introducing nitrogen gas therein, the mixture was warmed to 60° C. Then, 3.8 g of Initiator VII-1 was added to the system. The mixture was allowed to stand at 58° to 60° C. for 48 hours to effect polymerization. The thus obtained colorless, transparent viscous solution was added to a large quantity of methanol to precipitate a white polymer. The precipitates were taken out by filtration and extracted with methanol and then with acetone using a Soxhlet's extractor to obtain PAA-HCl quantitatively (250 g).

The number average molecular weight $\overline{M}n$ of PAA-HCl determined by the measurement of osmotic pressure in an aqueous saline solution was 12000.

EXAMPLE 7

In a 200 ml Erlenmeyer's flask with a stopper, 50 g of the 85% aqueous solution of MAA-HCl and the 70% aqueous solution of zinc chloride prepared in Example 6 were charged. Each of Initiators VII-1 to 4 and VIII-1 and VIII-2 synthesized in Example 4 was added to the system. The mixture was allowed to stand at 60° C. for 48 hours to effect polymerization. After completion of the polymerization, the product was treated in a manner similar to Example 6. Thus PAA-HCl was obtained. The results are summarized in Table 2 below.

TABLE 2

| Kind of Initiator | Addition amount of Initiator g | Amount and yield of PAA-HCl g | | Intrinsic viscosity* |
|---|---|---|---|---|
| Initiator VII-1 | 0.418 | 35.3 | 83.0 | 0.37 |
| " | 0.628 | 41.7 | 98.0 | 0.33 |
| Initiator VII-2 | 0.469 | 34.1 | 80.2 | 0.28 |
| " | 0.704 | 38.3 | 90.0 | 0.23 |
| Initiator VII-3 | 0.520 | 32.5 | 76.5 | 0.25 |
| " | 0.781 | 37.6 | 88.5 | 0.24 |
| Initiator VII-4 | 0.564 | 29.9 | 70.4 | 0.26 |
| " | 0.846 | 34.0 | 80.1 | 0.23 |
| Initiator VIII-1 | 0.528 | 33.2 | 78.1 | 0.21 |
| " | 0.791 | 35.4 | 83.3 | 0.20 |
| Initiator VIII-2 | 0.579 | 28.6 | 67.3 | 0.25 |
| " | 0.868 | 30.2 | 71.1 | 0.23 |

*Indicates an intrinsic viscosity at 30° C. when 0.5 g of a polymer was dissolved in 100 ml of 1/10 M-NaCl.

For the purpose of comparative study, an example of polymerization of MAA-HCl using 2,2'-azoisobutyronitrile in the presence of diethyl phosphite shown in German Offenlegungsschrift No. 2,946,550 was repeated by the present inventors. The details are shown below.

COMPARISON EXAMPLE 1

In accordance with the process described at page 36 of German Offenlengungsschrift No. 2,946,550, 100 ml of t-butanol was charged in a 1 liter round bottom flask while introducing nitrogen. The mixture was heated under reflux while stirring. A solution of 46.8 g of MAA-HCl and 0.5 g of diethyl phosphite in 500 ml of t-butanol and a solution of 0.3 g of azobisisobutyronitrile (AIBN) in 50 ml of chlorobenzene were dropwise added simultaneously to t-butanol in the aforesaid flask. A time period required for completion of the dropwise addition of the two solution was approximately 60 minutes. Then, the reaction mixture was refluxed for 3 hours. In initial 2 hours out of the 3 hours, a solution of 0.3 g of AIBN in 50 ml of chlorobenzene was further added to the system. The reaction mixture was cooled to 20° C., filtered and washed with ethyl acetate. Thereafter the system was dried at 60° C. under reduced pressure to obtain 0.25 g (yield 0.53%) of a yellow hygroscopic product. It was failed to determine the polymerization degree of the product because the amount of the product produced was small. However, the fact that the product was hygroscopic indicates that the product would have a relatively low polymerization degree.

We claim:

1. A process for producing a polymer of monoallylamine or a salt thereof which comprises polymerizing an inorganic acid salt of monoallylamine in a polar solvent in the presence of an azo type initiator selected from azo compounds represented by formulae (III), (IV), (VII) and (VIII):

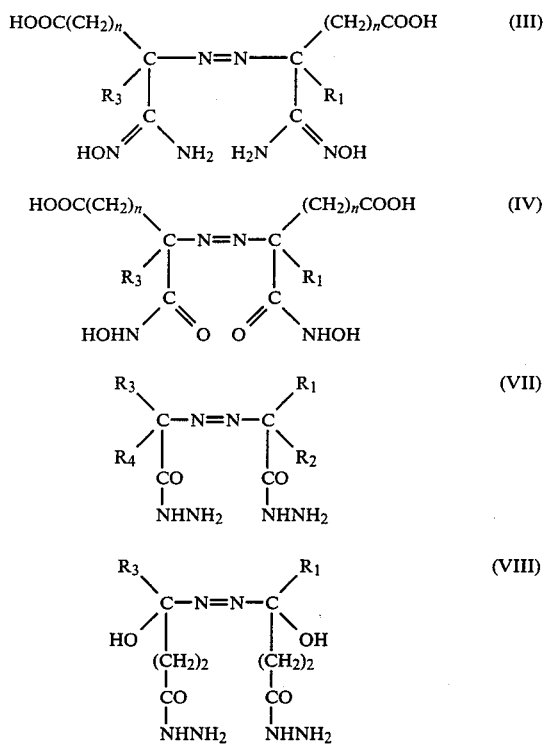

wherein $R_1$, $R_2$, $R_3$ and $R_4$ each represents, which may be the same or different, a hydrocarbon group; $R_1$ and $R_2$ or/and $R_3$ and $R_4$ may be combined to complete a ring together with the carbon atom attached thereto; and n represents 0 or an integer of 1 to 4.

2. The process according to claim 1 wherein said hydrocarbon group is selected from a group consisting of a straight or branched alkyl group having 1 to 4 carbon atoms, a cycloalkyl group having 3 to 6 carbon atoms, a phenyl group and a benzyl group.

3. The process according to claim 1 wherein said ring is selected from a member consisting of a cyclopentane ring and a cyclohexane ring.

4. The process according to claim 1 wherein said alkyl group is straight or branched and has 1 to 4 carbon atoms.

5. The process according to claim 1 wherein said azo type intiator is used in an amount of 0.1 to 10 wt. % based on the weight of said inorganic acid salt of monoallylamine.

6. The process according to claim 5 wherein said azo type initiator is used in an amount of 1 to 6 wt. % on the same basis.

7. The process according to claim 1 wherein said polar solvent is water.

8. The process according to claim 1 wherein said polar solvent is an inorganic acid, an organic acid or an aqueous solution thereof.

9. The process according to claim 8 wherein said inorganic acid is selected from hydrochloric acid, sulfuric acid, phosphoric acid and polyphosphoric acid and said organic acid is selected from formic acid, acetic acid, propionic acid and lactic acid.

10. The process according to claim 1 wherein said polar solvent is selected from an alcohol, dimethylsulfoxide, dimethylformamide and formamide.

11. The process according to claim 1 wherein said polar solvent is an aqueous solution of an inorganic acid salt.

12. The process according to claim 11 wherein said inorganic acid salt is selected from zinc chloride, calcium chloride and magnesium chloride.

13. The process according to claim 1 wherein said azo type initiator is used singly or in combination.

14. The process according to claim 1 wherein said combination is the azo type initiator represented by formula (VII) and the azo type initiator represented by formula (VIII).

15. The process according to claim 1 wherein said inorganic acid salt of monoallylamine is selected from hydrochloride, sulfate, sulfite and phosphate of monoallylamine.

16. The process according to claim 1 wherein said polymer of the inorganic acid salt of monoallylamine may be converted into said polymer of monoallylamine or into the polymer of an organic acid salt of monoallylamine.

* * * * *